(12) United States Patent  (10) Patent No.: US 7,821,386 B1
Barrett et al.  (45) Date of Patent: Oct. 26, 2010

(54) DEPARTURE-BASED REMINDER SYSTEMS

(75) Inventors: Karen Barrett, Chatswood (AU); Neil Hepworth, Artarmon (AU); Colin Blair, Westleigh (AU); Nandor Klatsmanyi, Berowra (AU); Luke Tucker, Beacon Hill (AU)

(73) Assignee: Avaya Inc., Basking Ridge, NJ (US)

( * ) Notice: Subject to any disclaimer, the term of this patent is extended or adjusted under 35 U.S.C. 154(b) by 210 days.

(21) Appl. No.: 11/249,121

(22) Filed: Oct. 11, 2005

(51) Int. Cl.
*B60Q 1/00* (2006.01)

(52) U.S. Cl. ............... 340/457; 340/539.11; 340/686.6; 340/573.1

(58) Field of Classification Search ............... 340/573.1, 340/573.4, 539.11, 539.13, 572.1, 5.92, 457; 235/375, 385
See application file for complete search history.

(56) References Cited

U.S. PATENT DOCUMENTS

| | | |
|---|---|---|
| 515,426 A | 2/1894 | French et al. |
| 4,074,069 A | 2/1978 | Tokura et al. |
| 4,275,385 A | 6/1981 | White |
| 5,206,903 A | 4/1993 | Kohler et al. |
| 5,315,434 A | 5/1994 | Mizuno et al. |
| 5,555,376 A | 9/1996 | Theimer et al. |
| 5,627,375 A | 5/1997 | Hsieh |
| 5,680,450 A | 10/1997 | Dent et al. |
| 5,689,548 A | 11/1997 | Maupin et al. |
| 5,742,666 A | 4/1998 | Alpert |
| 5,793,861 A | 8/1998 | Haigh |
| 5,805,999 A | 9/1998 | Inoue |
| 5,828,747 A | 10/1998 | Fisher et al. |
| 5,905,659 A | 5/1999 | Rose |
| 5,905,793 A | 5/1999 | Flockhart et al. |
| 5,960,061 A | 9/1999 | Fahie et al. |
| 5,982,873 A | 11/1999 | Flockhart et al. |
| 6,067,017 A | 5/2000 | Stewart et al. |
| 6,076,121 A | 6/2000 | Levine |
| 6,100,806 A | 8/2000 | Gaukel |
| 6,104,288 A | 8/2000 | Hopkins |
| 6,114,963 A * | 9/2000 | Blake et al. ............... 340/573.4 |
| 6,173,053 B1 | 1/2001 | Bogart et al. |
| 6,192,122 B1 | 2/2001 | Flockhart et al. |
| 6,236,365 B1 | 5/2001 | LeBlanc et al. |

(Continued)

FOREIGN PATENT DOCUMENTS

EP   0 899 673 A2   3/1999

(Continued)

OTHER PUBLICATIONS

U.S. Appl. No. 10/810,459, Orbach.

(Continued)

*Primary Examiner*—George A Bugg
*Assistant Examiner*—Hongmin Fan
(74) *Attorney, Agent, or Firm*—Sheridan Ross P.C.

(57) ABSTRACT

A location-based reminder system includes a controller 112 that determines when a person is in and/or leaving a defined area 104; when a person is determined to be in and/or leaving the defined area 104, identify a reminder to be provided to the person, the reminder including information about at least one object associated with the person; and provide the reminder to the person before the person leaves the defined area 104.

2 Claims, 6 Drawing Sheets

U.S. PATENT DOCUMENTS

| | | | |
|---|---|---|---|
| 6,249,227 | B1 | 6/2001 | Brady et al. |
| 6,265,963 | B1 | 7/2001 | Wood, Jr. |
| 6,275,794 | B1 | 8/2001 | Benyassine et al. |
| 6,310,549 | B1 | 10/2001 | Loftin et al. |
| 6,362,778 | B2 | 3/2002 | Neher |
| 6,449,358 | B1 | 9/2002 | Anisimov et al. |
| 6,453,291 | B1 | 9/2002 | Ashley |
| 6,456,964 | B2 | 9/2002 | Manjunath et al. |
| 6,462,660 | B1 * | 10/2002 | Cannon et al. ........... 340/572.1 |
| 6,463,607 | B2 | 10/2002 | Hartmann |
| 6,486,780 | B1 | 11/2002 | Garber et al. |
| 6,504,838 | B1 | 1/2003 | Kwan |
| 6,580,908 | B1 | 6/2003 | Kroll et al. |
| 6,600,443 | B2 | 7/2003 | Landt |
| 6,650,901 | B1 | 11/2003 | Schuster et al. |
| 6,678,357 | B2 | 1/2004 | Stumer et al. |
| 6,687,609 | B2 | 2/2004 | Hsiao et al. |
| 6,687,668 | B2 | 2/2004 | Kim et al. |
| 6,694,787 | B1 | 2/2004 | Brown |
| 6,705,522 | B2 | 3/2004 | Gershman et al. |
| 6,707,383 | B2 | 3/2004 | Flaherty |
| 6,757,359 | B2 | 6/2004 | Stumer et al. |
| 6,778,084 | B2 | 8/2004 | Chang et al. |
| 6,778,096 | B1 | 8/2004 | Ward et al. |
| 6,804,329 | B2 | 10/2004 | Geck et al. |
| 6,825,767 | B2 | 11/2004 | Humbard |
| 6,898,434 | B2 | 5/2005 | Pradhan et al. |
| 6,907,238 | B2 | 6/2005 | Leung |
| 6,990,328 | B2 | 1/2006 | Crandall et al. |
| 6,992,587 | B2 * | 1/2006 | Maeda et al. ........... 340/572.1 |
| 6,996,402 | B2 * | 2/2006 | Logan et al. ............. 455/456.1 |
| 7,005,985 | B1 | 2/2006 | Steeves |
| 7,027,564 | B2 | 4/2006 | James |
| 7,030,731 | B2 | 4/2006 | Lastinger et al. |
| 7,317,716 | B1 | 1/2008 | Boni et al. |
| 2002/0103636 | A1 | 8/2002 | Tucker et al. |
| 2002/0165711 | A1 | 11/2002 | Boland |
| 2002/0167405 | A1 | 11/2002 | Shanks et al. |
| 2002/0173328 | A1 | 11/2002 | Min |
| 2003/0152212 | A1 | 8/2003 | Burok et al. |
| 2004/0002305 | A1 | 1/2004 | Byman-Kivivuori et al. |
| 2004/0029558 | A1 | 2/2004 | Liu |
| 2004/0119600 | A1 * | 6/2004 | Hampton ................. 340/691.1 |
| 2004/0134984 | A1 | 7/2004 | Powell et al. |
| 2004/0135674 | A1 | 7/2004 | Shanks et al. |
| 2004/0142678 | A1 | 7/2004 | Krasner |
| 2004/0203352 | A1 | 10/2004 | Hall et al. |
| 2005/0083911 | A1 | 4/2005 | Grabelsky et al. |
| 2005/0088299 | A1 | 4/2005 | Bandy et al. |
| 2005/0136903 | A1 * | 6/2005 | Kashima et al. ............. 455/418 |
| 2006/0017541 | A1 * | 1/2006 | Nguyen ..................... 340/5.81 |
| 2007/0124393 | A1 | 5/2007 | Maes |
| 2008/0098060 | A1 | 4/2008 | Boni et al. |

FOREIGN PATENT DOCUMENTS

| | | |
|---|---|---|
| EP | 0 998 108 A1 | 5/2000 |
| EP | 1 091 307 A2 | 4/2001 |
| EP | 1 150 236 A2 | 10/2001 |
| JP | 2004013789 | 1/2004 |
| WO | WO 2005001669 | 1/2005 |
| WO | WO 2005/122534 | 12/2005 |

OTHER PUBLICATIONS

Avaya "Administrator's Guide for Avaya Communication Manager: vols. 1, 2, and 3," 555-533-506, Issue 7 (Nov. 2003), pp. 121, 129, 886, 889, 1169, 1193, 1555.

Comments of Nortel Networks, Before the Federal Communications Commission, WC Docket No. 04-36, May 28, 2004, pp. 1-22 with Appendices 1-4.

Khaled El-Maleh et al., "Comparison of Voice Activity Detection Algorithms for Wireless Personal Communications Systems," McGill University, Department of Electrical Engineering (1997), pp. 1-26.

Nikos Doukas et al., "Voice Activity Detection Using Source Separation Techniques", Signal Processing Section, Dept. of Electrical Engineering, Imperial College, UK, four (4) pages; undated.

Schulzrinne, "Providing Emergency Call Services for SIP-based Internet Telephony", Available at: http://www.iptel.org/info/players/ietf/location/draft-schulzrinne-sip-911- -00.txt, Jul. 2000, pp. 1-14.

WYSE, RFID, available at http://searchnetworking.techtarget.com/sDefinition/0,,sid7_gcl805987,00.html, 2 pages (updated Jan. 16, 2004).

"Perimeter Security Sensor Technologies Handbook," available at http://www.nlectc.org/perimetr/full2.htm, 104 pages; printed Feb. 2, 2005.

U.S. Appl. No. 10/607,414, filed Jun. 26, 2003, Becker et al.
U.S. Appl. No. 10/652,914, filed Aug. 28, 2003, Gentle et al.
U.S. Appl. No. 10/795,119, filed Mar. 5, 2004, Moon et al.
U.S. Appl. No. 10/911,090, filed Aug. 3, 2004, Fegan et al.
U.S. Appl. No. 10/932,507, filed Sep. 1, 2004, Fegan et al.
U.S. Appl. No. 11/040,352, filed Jan. 20, 2005, Klatsmanyi et al.

Applied Generics Technical Report "NERO24 Mobile Location System (GSM Edition)," Version 1.0 (2004), pp. 1-27.

RFID Journal, *Frequently Asked Questions,* Manufacturing, available at http://www.rfidjournal.com/article/articleview/207, 7 pages.

AIM, *RFID.ORG,* Searching for RFID Information, available at http://www.aimglobal.org/technologies/rfid, 3 pages.

WYSE, *RFID,* available at http://searchnetworking.techtarget.com/sDefinition/0,,sid7_gci805987,00.html, 3 pages (Downloaded Oct. 3, 2005).

Time Online Edition, *Global Business—The See-It-All Chip,* available at http://www.time.com/time/globalbusiness/article/0,9171,1101030922-485764-3,00.html, 4 pages (Sep. 22, 2003).

Wired News, *Radio ID Tags: Beyond Bar Codes,* available at http://www.wired.com/news/technology/0,1282,52343,00.html, 4 pages (May 20, 2002).

Newsweek, *An Internet of Things—Is RFID the Mark of Satan . . . ,* available at http://msnbc.msn.com/id/3068871, 4 pages (Jun. 10, 2004)(Downloaded Sep. 23, 2005).

RFID, *Tracking Everything, Everywhere,* by Katherine Albrecht, available at http://www.stoprfid.org/rfid_overview.htm, 6 pages.

RFID, *Wikipedia, the free encyclopedia,* available at http://en.wikipedia.org/wiki/RFID, 10 pages (Updated Oct. 2, 2005).

The Denver Post, *Bar Code Meets Its Match,* Section C, (Jun. 3, 2004), 4 pages.

Cisco Systems, Inc., *Cisco Emergency Responder* Version 1.1 (Oct. 2001), 5 pages.

Avaya: Communication without Boundaries, *Solving the Challenges of E911 Service with Avaya IP Telephony Networks,* White Paper, Nov. 2002, Issue 1.1, 10 pages.

Cisco Data Sheet, *Cisco Emergency Responder Version 1.1, Jul. 20, 2002,* available at http://www.cisco.com/warp/public/cc/pd/unco/cer/prodlit/emerg_ds.htm, 7 pages.

Cisco, *Cisco Emergency Responder,* downloaded Oct. 3, 2005, available at http://www.cisco.com/warp/public/cc/pd/unco/cer/, 2 pages.

EIA Telecommunications Industry Association, *TIA Telecommunications Systems Bulletin: Telecommunications—IP Telephony Infrastructures—IP Telephony Support for Emergency Calling Service,* , TSB-146, Mar. 2003, 36 pages.

RedSky Technologies, Inc.; "Welcome to RedSky's E-911 Business Watch" *E-911 Business Watch,* Issue 4 (Oct. 21, 2003), 5 pages.

Active Campus Tutorial by David Casteron dated Oct. 11, 2003, downloaded from http://activecampus-dev.ucsd.edu/ntutorial/main.htm on Apr. 12, 2005.

Dressen et al., *Project Mayhem ,* available at http://www.cs.colorado.edu/upgrad/seniorproject/projects/projectmahhem.html, 2 pages, (2003)(Downloaded on Apr. 12, 2005).

*Mobile in a Minute ,* available at www.mobilein.com/location_based_services.htm, 3 pages, (Downloaded on Apr. 12, 2005).

Ericsson, *Location Based Services,* available at http://www.ericsson.com/telecomreport/article.asp?aid=34&tid=tid=201&ma=1&msa=3, 3 pages, (Updated Oct. 3, 2002).

U.S. Appl. No. 12/342,484, Ellsworth et al., filed Dec. 23, 2008.

Alcatel-Lucent, http://www1.alcatel-lucent.com/doctypes/articlepaperlibrary/pdf/ATR2005Q1/T0503-Rich_presence-EN.pdf.

Nedergaard, Cisco Unified Presence Solutions, Tech Update 6/8 Feb. 2007, Cisco Systems Denmark, http://www.cisco.com/web/DK/assets/docs/Techupdatefeb2007kunder.pdf.

Niemi, "Session Initiation Protocol (SIP) Extension for Event State Publication", IETF RFC 3903, Oct. 2004, http://tools.ietf.org/html/rfc3903.

Roach, "Session Initiation Protocol (SIP)—Specific Event Notification", IETF RFC 3265, Jun. 2002, http://www.ietf.org/rfc/rfc3265.txt.

Rosenberg, "A Data Model for Presence", IETF RFC 4479, Jul. 2006, http://tools.ietf.org/html/rfc4479.

Rosenberg, "A Presence Event Package for the Session Initiation Protocol (SIP)", IETF RFC 3856, Aug. 2004, http://tools.ietf.org/html/rfc3856.

Rosenberg, "A Watcher Information Event Template-Package for the Session Initiation Protocol (SIP)", IETF RFC 3857, Aug. 2004http://tools.ietf.org/html/rfc3857.

Rosenberg, "An Extensible Markup Language (XML) Based Format for Watcher Information", IETF RFC 3858, Aug. 2004, http://tools.ietf.org/html/rfc3858.

Sofia-SIP 1.12.9devel1, publication of Nokia, http://sofia-sip.sourceforge.net/refdocs/sip/group__sip_headers.html, accessed Dec. 22, 2008, 5 pages.

Sugano, et al., "Presence Information Data Format (PIDF)", IETF RFC 3863, Aug. 2004, http://tools.ietf.org/html/rfc3863.

Background of the Invention for the above-captioned application (previously provided).

* cited by examiner

DEPARTURE-BASED REMINDER SYSTEMS

FIELD

The invention relates generally to object and/or person identification and specifically to a departure or location-based reminder system and method that notifies a person leaving a predetermined or selected area of something that relates to the person and/or the predetermined area.

BACKGROUND

There exist many identification technologies that enable users to gain access to an asset, perform a transaction, control a production process, etc. For example, Radio Frequency IDentification or RFID systems, magnetic identification systems, biometric identification systems, and the like have long been used to protect various assets (i.e. access to a building, room, computer, etc.) by allowing only authorized individuals admission to those assets.

RFID, in particular, is gaining wide acceptance as a highly effective and inexpensive automatic identification methodology. "RFID" is a generic term for technologies that use radio waves to identify objects automatically. Passive and active RFID transponders or tags contain coiled antennas to enable them to receive and respond to radio-frequency queries from an RFID reader or transceiver (which also includes an antenna). The transceiver converts the radio waves returned from the RFID tag into a form that can be passed onto computers. Typically, a serial number that identifies a product uniquely, and, sometimes other information, is stored on the RFID tag (which can store up to 2 KB of data). Passive RFD) tags do not have a power supply. A minute electrical current induced in an antenna by the incoming Radio-Frequency field ("RF field") can provide enough power for the tag to send a response. Active RFID tags have an on-board power source and may have longer ranges and larger memories than passive tags and the ability to store additional information sent by the transceiver. Semi-passive RFID tags use an on-board power source to run the tag's circuitry but communicate by drawing power from the transceiver. Chips in RFID tags can be read-write or read-only.

RFID has been used in a number of applications to increase efficiencies and decrease costs. However, the full potential of RFID and other identification systems has yet to be realized.

Historically, there has been, and remains a need, for an effective reminder system, particularly as society grows in complexity. For example, all too often people rush out of their house only to realize upon the sudden "click" of the door closing that they have forgotten their keys inside and are now locked outside. It is a sick feeling that begins to set in when one wonders where they left their keys. They are sure that the keys are not with them and wish they had a way to replay the last few seconds that have just elapsed. In another example, business people often leave for an afternoon meeting in such haste that they forget their ID card, wallet, or briefcase. The time spent going back to their office for the forgotten item could make them late to their meeting.

There have been some attempts to solve this problem, but all fall short of a complete solution. For example, one could simply stick a note on their door or in another obvious location as a reminder to take keys, a wallet, brief case, etc. Because notes are not personalized, this solution is inconvenient, cumbersome, and potentially unobtrusive for a household that has more than one person. There may be several notes on the door and each person leaving must scan all notes to see which ones are theirs. Worse yet, the note may be displaced or lost before it is to be used. Also, this particular solution cannot be remotely programmed.

Global Positioning System or GPS-based systems are also ineffective in many situations. Although such systems may notify a person when he or she is leaving a specified location, such systems fail to provide audible or visual reminders to perform specific actions, such as retrieving an object or making a phone call. GPS systems are further hindered because of GPS' inability to pinpoint accurately a person's location within a building. Even worse, a person forgetting the GPS location device would be in no better shape in remembering to perform an action than a person who does not own a GPS location device.

Time-based reminder systems are another incomplete solution. Time-based reminder systems provide a reminder at a specific time or times (e.g., meeting reminder at 7:25 am for a meeting at 7:30 am). The reminder can be in the form of an audio and/or visual message. This type of reminder system is not always ideal, as it is not based on location. For example, it is generally ineffective in reminding people to pick up objects, such as keys, cellular phone, and wallet, as one leaves a location, such as a house or apartment. The person may leave home early and receive the reminder after it is too late.

A need therefore exists for a location-based reminder system that can create personalized departure-based messages for individuals regardless of the time that they leave a selected location. There also exists a need for these systems to be able to be remotely programmed, so that users are not constrained by their current location with respect to their desired reminder location.

SUMMARY

The present invention is directed generally to a programmable, automated location- or departure-based reminder system and method.

In one embodiment, an electronic scanning device is positioned within and/or at a boundary of a specified location or region, such as at an entrance or exit to a building or other structure. The scanning device could use any object detection device, such as RFID tags, to detect the presence and/or absence of one or more selected items on a user's person. As a person leaves the specified location, the person is scanned for a set of selected items. If one of the selected items is not found, an alert will occur notifying the person that a selected item or items is not on their person. In other words, when a particular RFID code is detected, a particular reminder is given to a person. If all the selected items are present, no alert would be provided.

In a different embodiment, a less intelligent system can be used. In particular, when a person is sensed to be leaving a defined location, the reminder system will remind that person of all items they wish to have with them.

In another embodiment, a motion detector is positioned within and/or at the boundary of the specified location or region. The motion detector can be any suitable motion detector, such as an infrared detector (which senses thermal energy from or the thermal energy fingerprint of a person's body), a sound detector (which senses noise from a person moving through an area), an airflow detector (which senses the movement of air from a person moving through an area), and a vibration detector (which senses vibrations from a person's passing). When movement of a (human-sized) object is detected, the list of previously selected items and/or activities is announced. As used herein, an "object" refers not only to an item but also to an activity (e.g., meeting, task, action, and the like) to be performed by the person. The list or set of objects may have one or more members previously selected and programmed by the person using a suitable user interface. A drawback of this approach is that the motion detector may be impersonal; that is, the detector may be unable to distinguish one person from another and will simply play the announcement whenever a person of a certain size walks past the detector. More elaborate motion detectors, however, may be able to distinguish the distinctive characteristics of each person's thermal "fingerprint" or differences in the thermal signature of each person's body.

In another embodiment, a GPS-based location system is coupled with a reminder system to provide a location-based reminder system. GPS signals would be analyzed to trigger a reminder when a person has left a selected spatial area. For example, if the reminder is to bring a book to work, the reminder would be provided as the person is pulling his car out of the driveway and/or onto the street. In that event, it would still be convenient to return to the house and grab the book. In this embodiment, the GPS locator and reminder would be carried by the person and would communicate with one another via an interface. Typically, the GPS locator would provide GPS coordinates to the reminder system. The reminder system would map the coordinates against a preselected or previously determined list of coordinate sets. When, during a specified elapsed time period, the distance between a selected set of coordinates (at which the person was previously located within the elapsed time period) and the current set of coordinates is greater than or equal to a specified distance, the reminder would be provided to the person. Alternatively, the selected set of coordinates could be the location at which the reminder is to be provided. Thus, in the above example the selected set of coordinates would be the location of the person's driveway and, when the GPS coordinates provided to the reminder system coincide with the selected set of coordinates, the reminder would be provided. The combined GPS/reminder device could be positioned in or on a device the person always carries on his person, such as a cellular phone, a PDA, an item of jewelry (e.g., watch, ear ring, necklace, bracelet, neck chain, etc.), a chip implant, and the like, so the device itself is not forgotten. A drawback of this approach is that the reminder would be provided for certain objects after it is no longer convenient for them to be retrieved. For example, the reminder would be provided after the user has left home; therefore, if keys were the object in the reminder and the person forgot his keys, the person would already be locked out of his/her home.

The above embodiments can be programmed to provide reminders for different things at different times. A morning reminder may be to meet someone for breakfast. An afternoon reminder on the same day may be to bring work out clothes. A reminder on Monday may be to attend a meeting at work while a reminder on Tuesday may be to stop by a drugstore on the way to work and pick up a drug prescription.

The above embodiments may be programmed for different members of a household, each member having a different list or set of selected objects. Each person may be identified by his or her distinguishing characteristics, such as height, weight, thermal signature and/or appearance. For example, each member may be distinguished by a suitable motion detector as noted above, by a scale positioned in the person's path, and/or by a unique RFID signature or code in an RFID device carried on the person. The carried RFID device could be passive or active.

A more elaborate configuration allows a person, including third parties, to program the device remotely. For example, a colleague wishes to borrow a book a person has at home. The colleague, if in a list of permissions maintained by the person, could remotely communicate with the device and program the device to remind the person to bring the book the next time the person leaves home. Remote programming, for example, could be done by an Internet communication device, such as a Personal Computer or PC, laptop, Personal Digital Assistant or PDA, cellular phone, and the like, through a suitable interface, such as a Web browser and a Graphical User Interface or GUI using packet-switched messages, a Telephone User Interface or TUI using DTMF signals, and/or a Short Message Service or SMS interface. An important aspect of this configuration is that the colleague or third person be not only in a list of individuals having authority to program the device but also successfully authenticated by the reminder system before permitting the person to program the system.

The device could have logic that would permit it to generate its own list of objects. For example, if the device determines the actual or possible existence of a weather condition, such as rain, snow, ice, sunshine, cloudy condition, cold temperature, and warm temperature, the device could select a preprogrammed list of objects from a plurality of preprogrammed lists to provide to the person. For example, the list for rain would include a rain coat, goulashes, and umbrella, for snow or ice would be boots or galoshes, for sunshine would be sunglasses or sunscreen, for cloudy condition would be umbrella, for cold temperature would be coat or jacket, and for warm temperature would be shorts or short-sleeved shirt. The weather condition may be sensed by one or more sensors (e.g., precipitation sensor, thermometer, ambient pressure sensor (e.g., manometer), a humidity sensor, anemometer, atmometer, positioned on the exterior of the building and/or by electronic signals received from a weather prediction service.

The present invention can provide an accurate, convenient, inexpensive, location-based reminder system that is programmable by a user. As such, it can provide timely reminders to retrieve and/or perform certain objects. It can provide personalized reminders for each member of a household. It can be remotely programmed. It can be configured such that the reminder is provided without a person carrying a dedicated device on his/her person.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

The invention will be illustrated below in conjunction with an exemplary identification and departure-based reminder system. Although well suited for systems that employ an RFID reader and identification system, the invention is not limited for use with any particular identification system or configuration of system elements. Those skilled in the art will recognize that the disclosed techniques may be used in any identification application in which it is desirable to provide a departure based reminder system.

Figure 1:
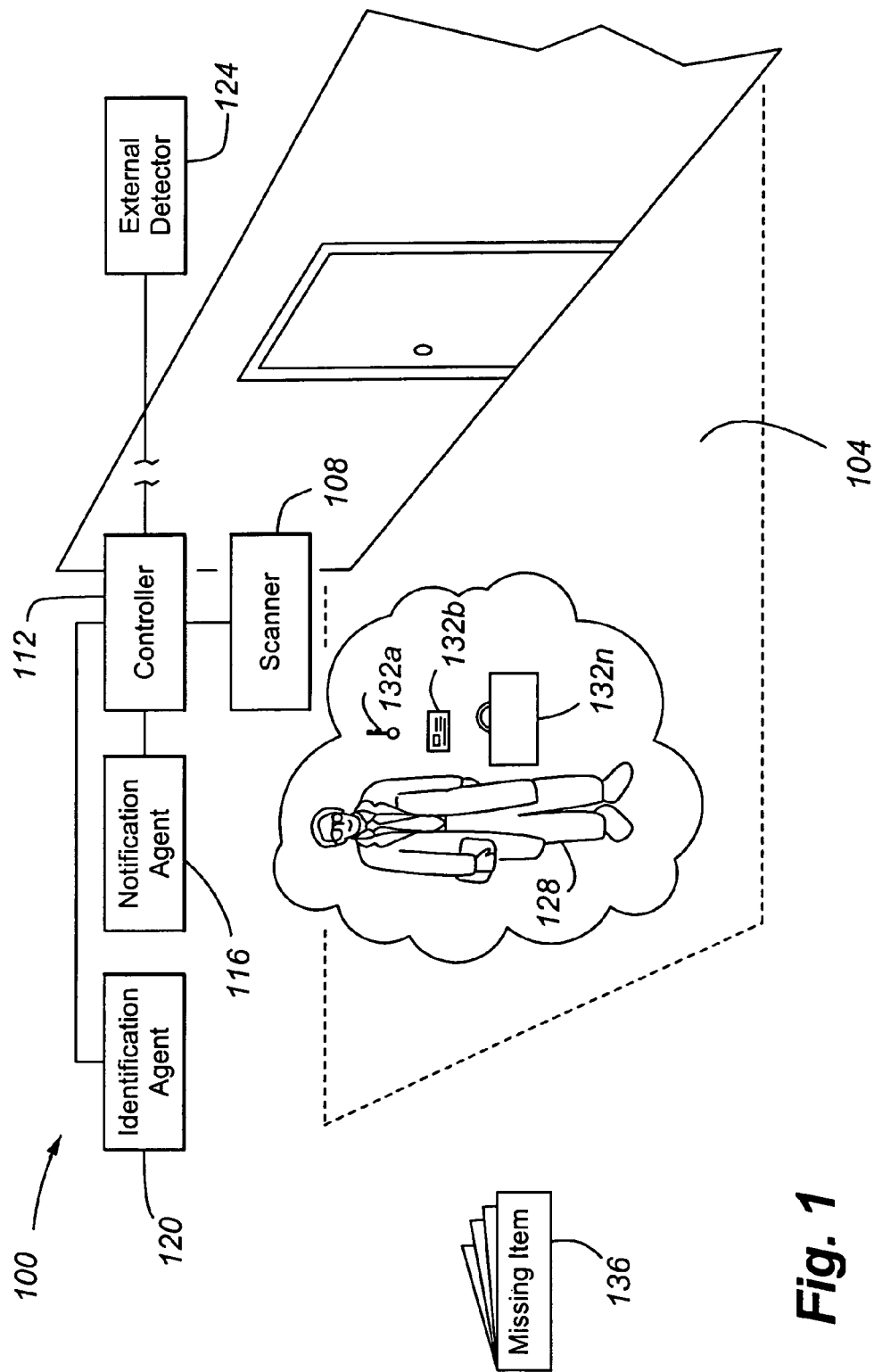
FIG. 1 is a diagram depicting a departure based reminder system in accordance with one embodiment of the present invention.

FIG. 1 shows an illustrative embodiment of the present invention. An identification and reminder system 100 includes, in one embodiment, a predetermined zone or area 104, a scanner 108, a controller 112, a notification agent 116, an identification agent 120, and an external detector 124. The controller 112 is operable to receive information from the scanner 108, identification agent 120, and external detector 124. The scanner 108, identification agent 120, and external detector 124 each provide identification information, external information, and any other necessary data to the controller 112. This data is then used, as will be described later, to generate a message. The generated message is sent to the notification agent 116. All connections between each of these members can be wireless, wired, or a combination thereof. Specifically, it may be advantageous to have the external detector 124 be in wireless communication with the controller 112 for convenience and to eliminate unnecessary, potentially hazardous wires.

The term "controller" as used herein should be understood to include any type of processor-based control devices such as media servers, computers, adjuncts, etc.

In accordance with one embodiment of the present invention, the zone 104 is a predetermined or selected zone or spatial area. The zone 104 can be near the exit of any building or room in the building. Likewise, the zone 104 may be an entire room in itself. For example, a laundry room that must be passed through before exiting a house could be considered a zone. Furthermore, a zone can be an entire building with multiple exit points. The zone 104 may also be defined by the range of operation of the scanner 108 and/or identification agent 120. As with any spatial area, the zone is circumscribed by a boundary.

The identification agent 120 is primarily used to identify a person 128 that is within the zone 104. The identification agent 120 determines that a person is in and/or leaving a zone 104 by directly detecting the spaced relationship of the person with the zone 104. This is done without the person having to carry an item with them for identification. However, certain embodiments of the present invention provide for an identification of the person by detecting objects with that person. Identification operations can be performed according to various methods including, height scanners, scales, biometric identification, voice recognition, or other identification methods. Also, the identification agent 120 does not only need to be limited to human identification. It is also advantageous to be able to identify an animal that passes into zone 104. The identification agent 120 determines who has entered the zone 104 and relays that identification information to the controller 112. A table (not shown) storing identification information for various individuals can exist in the identification agent 120. In this instance, the identification agent would scan readings for a particular individual and make the determination of that person's (or thing's) identity. The determined identity could be then sent to the controller 112. Alternatively, the database storing identification information for various individuals can be kept in the controller 112. In this configuration, the identification agent 120 simply collects readings for an individual then forwards that data on to the controller 112. Once the controller 112 receives raw data it can then establish the individual's identity.

In one configuration of the present invention, the scanner 108 is operable to identify various objects 132*a-n* that are with the person 128. Although, the present invention is well suited for an RFID reader to be the scanner 108, other variations may be suitable as well. For example, the scanner can be a barcode scanner and the objects 132*a-n* can have barcodes on them, the scanner 108 a magneto-acoustic reader and the objects 132*a-n* have a magneto-acoustic tag, and the scanner 108 an RFID transceiver and the objects 132*a-n* have RFID tag(s). The scanner 108 can be any wireless device capable of communicating via an air interface protocol with the population of RF addressable sensors 132*a-n*. In embodiments of the present invention, scanner 108 could be a wireless phone, a personal digital assistant (PDA), a computer having wireless communications capabilities, or other type of mobile, handheld, and/or computing device. Preferably, the scanner 108 emits electromagnetic radiation. More preferably, the scanner 108 is an RFID transceiver positioned within or at the boundary of a zone, and the tag(s) on the object(s) 132*a-n* are passive, semi-passive, or active RFID tag(s). Even more preferably, the RFID transceiver and tag apply the GTag standard and/or ISO 18000-6.

The range of a typical RFID tag depends on many factors, including the frequency of operation, the power of the reader, and interference from metal objects or other RF devices. Generally, low-frequency passive tags are read from about three feet and UHF passive tags are read from about 10 to 20 feet. Where longer distances are needed, active tags can be used.

According to the present invention, signals are exchanged between the scanner 108 and the population of RF addressable sensors 132*a-n* (associated with various objects) according to one or more protocols. Signals can be wireless signals, such as radio frequency (RF) transmissions. In an embodiment of the present invention, the scanner 108 and the population of sensors 132*a-n* communicate via a single protocol for both RFID tag communications and sensor communications. In an alternate embodiment, scanner 108 and the population of sensors 132*a-n* communicate via a first protocol for RFID tag communications and via a second protocol for sensor communications. Examples of protocols used for RFID tag communications are described in the following co-pending U.S. Patent Applications, each of which is incorporated by reference in its entirety: U.S. Publication Number 2002/167,405, filed Feb. 12, 2002, entitled "Radio Frequency Identification Architecture;" U.S. Publication Number 2004/135,674, filed Oct. 20, 2003, entitled "Method for the Efficient Reading of a Population of Radio Frequency Identification Tags with Unique Identification Numbers Over a Noisy Air Channel;" and U.S. Publication Number 2004/134,984, filed Oct. 27, 2003, entitled "Optimization of a Binary Tree Traversal with Secure Communications." The present invention is also applicable to any other types of communication protocols between tags and readers otherwise known or yet to be developed.

In one configuration, the scanner 108 determines what set of objects or items 132a-n are existent in and/or at the boundary of the zone 104. In an alternative configuration, the scanner 108 sends the identification data or tag credentials to the controller 112, where the identity of each object within the set of objects 132a-n is determined.

In an alternate configuration, the RFID tag reader (scanner 108) is an object that is carried by a person 128 and the tag reader reads an RFID tag as a person 128 attempts to leave a predefined zone 104. The placement and role of the RFID tag and tag reader are interchangeable. It may be advantageous for a person to carry the tag reader and have the tag define the zone 104.

Both the scanner 108 and the identification agent 120 can be connected, but external, to the corresponding controller or can be integral with the controller 112. In the former case, the external reader is in wireless or wired communication with the device via a port and commands are passed to the reader from the querying computational component. In the latter case, the scanner and identification agent 120 are internal to the controller and may be within a common housing. The latter case allows for a substantially autonomous scanning and identification device whereas the former case may provide more flexibility in the identification and reminder system 100.

In an alternative embodiment, the scanner 108 may perform operations of the identification agent 120. This is possible if the person 128 always carries an object from which the identity of the person 128 could be established. The identification agent/scanner could identify the object and therefore identify the person 128 that is in the zone 104. Also, the scanner 108 can read an implanted identification chip in a dog, for example, to determine its identity.

The external detector 124 is capable of making various determinations about conditions or situations that exist outside of the zone 104. For example, the external detector 124 may be a fuel gauge that wirelessly communicates the amount of gas that is present in a car's fuel tank. If the amount of fuel is below a predetermined limit, the controller 112 is able to make this determination based on the readings it is being sent from the external detector 124. Alternatively, like the identification agent 120 and scanner 108, the external detector 124 can make the required determination of the conditions outside of the zone 104 (i.e. if the amount of gas left is below the predetermined limit) and relay the required notification message to the controller 112. Also, the external detector 124 may be a device capable of determining weather conditions, so if it is raining outside relevant information is relayed to the controller 108 and the person 128 is reminded to grab an umbrella before they leave. The weather condition may be sensed by one or more sensors (e.g., precipitation sensor, thermometer, ambient pressure sensor (e.g., manometer), a humidity sensor, anemometer, atmometer, positioned on the exterior of the building and/or by electronic signals received from a weather prediction service.

The controller 112 takes the collected data from at least one of the scanner 108, identification agent 120, and external detector 124 and generates a personalized message for the individual that is leaving zone 104. The controller 112 utilizes the identification information it has been provided and determines what, if any, items are not with the person 128. The forgotten items 136 can be determined by making a comparison of the items that person 128 wanted to have when they left the zone 104, and what items they actually have 132a-n. The controller 112 can identify the forgotten item(s) 136 and prepare a message relating to the forgotten item(s) 136.

Messages can be personalized at an initial install or can be remotely changed by the user without being anywhere near zone 104. For example, the person's 128 work colleague may wish to borrow a book that the person 128 has at home. The person 128 can immediately, remotely, program the controller to remind them bring the book next time they leave their house. Remote programming can be done by an Internet or phone/SMS interface for example. The controller 112 could also be programmed for one-offs such as "pick up some milk". The person 128 can make a determination at any point in the day that they need more milk and at that point in time could program the controller to remind them just once. Then the first time person 128 attempts to leave zone 104 the reminder to "pick up some milk" is generated.

The notification agent 116 can convey a visual and/or audio message (e.g., by a speaker, LCD display, light display, buzzer, etc) that it has received from the controller 112. The generated message may include reminders to grab any forgotten items before the zone 104 is left. The generated message can also include any other predetermined reminders.

Additionally, the generated message can be programmed to provide reminders for different things at different times. A morning reminder may be to meet someone for breakfast. An afternoon reminder on the same day may be to bring work out clothes. A reminder on Monday may be to attend a meeting at work while a reminder on Tuesday may be to stop by a drugstore on the way to work and pick up a drug prescription. The combination of time-based reminders, object reminders, upon departure of a given area creates a robust reminder system.

Figure 2:
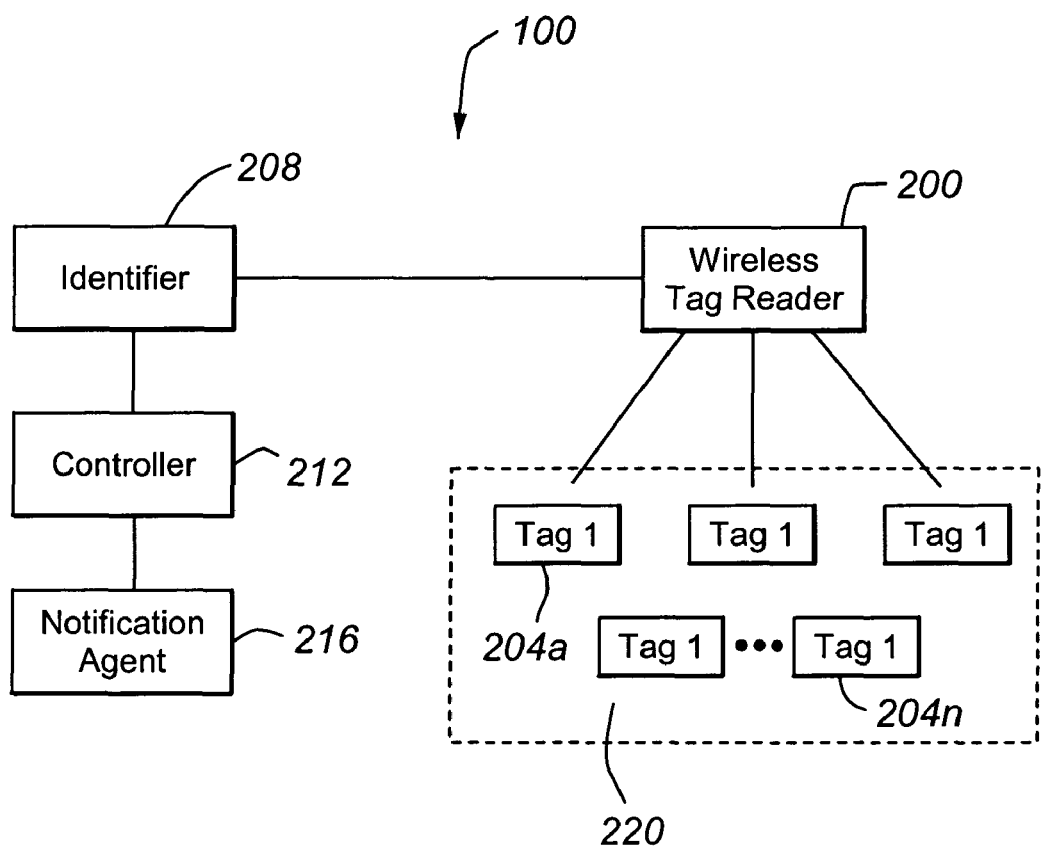
FIG. 2 is a block diagram depicting a departure based reminder system in accordance with another embodiment of the present invention.

Referring to FIG. 2 an alternative embodiment of the departure based reminder system will be described.

The reminder system 100 has a wireless tag reader 200 that is operable to interrogate various tags 204a-n that are passed within the interrogation zone 220. The tag(s) 204a-n are locally associated with a plurality of objects. The wireless tag reader then transmits the tag (object) 204a-n information to the identifier 208, where the tags are identified. Also, as described above, a person carrying the items to which the tags are attached could also be identified. The identification information is sent to the controller 212 for processing. The controller 212 uses the information from the identifier 208 to identify the person within the interrogation zone 220 and prepares a personalized message for that person. The controller 212 in this particular configuration does not have an identifier incorporated within it. Rather, the identifier 208 is a separate member that does some processing before information is passed to the controller 212. However, as mentioned above, the controller 212 and identifier 208 may also be contained within a single unit. Furthermore, the identifying functions can be performed by the tag reader, but this configuration results in a larger wireless tag reader.

The individualized message that is generated at the controller 212 is forwarded on to the notification agent 216. As described above, the notification agent 216 may be any device that can transform an electronic message into a human recognizable message. The message can be an audio and/or visual message.

Figure 3:
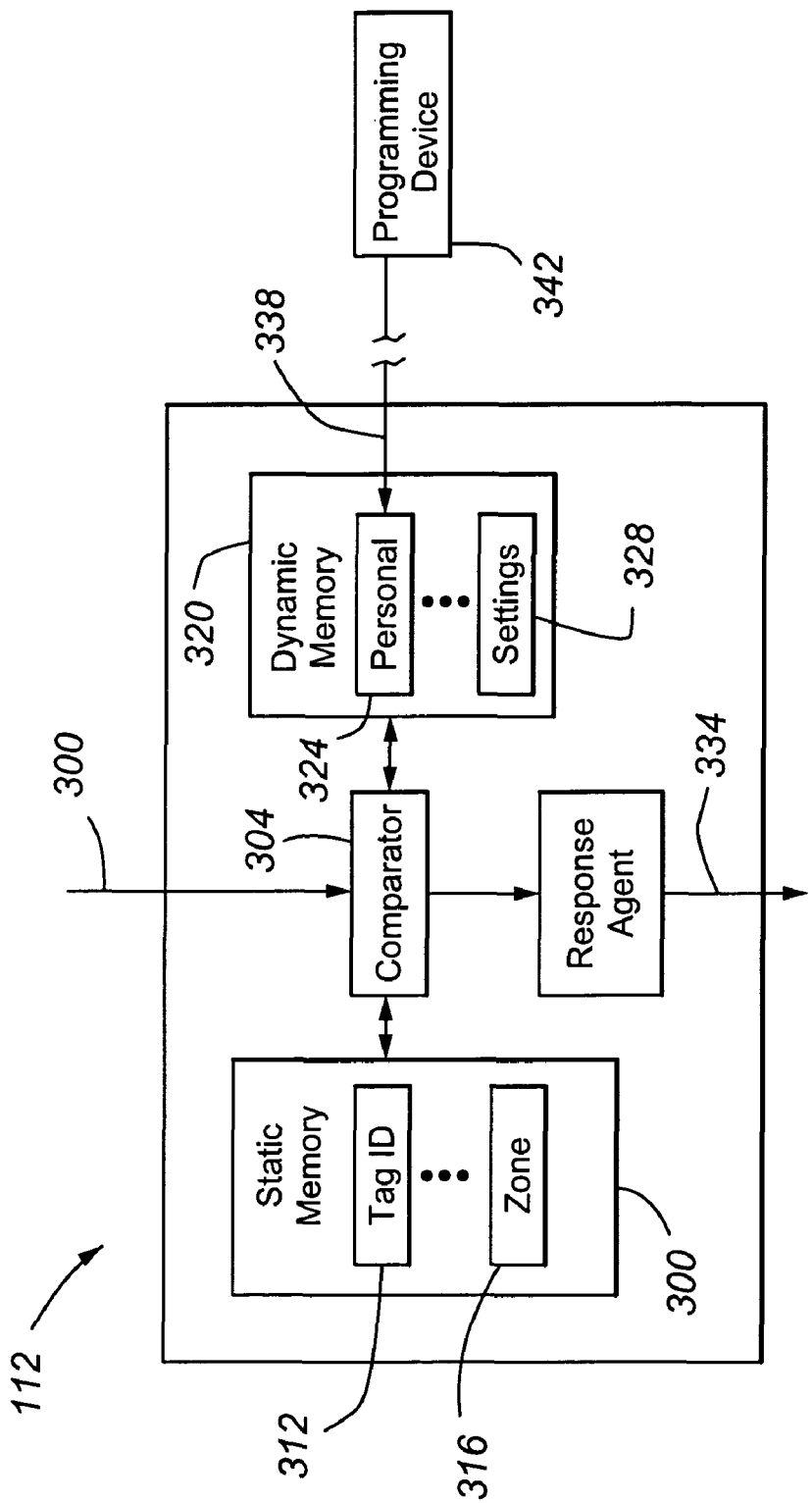
FIG. 3 is a block diagram depicting a controller in accordance with yet another embodiment of the present invention.

Referring now to FIG. 3 architecture of the controller 112 will be described in accordance with an embodiment of the present invention.

The controller 112 has an input line 300 where information from at least one of the scanner 108, identification agent 120, external detector 124, and identifier 208 is received. In one embodiment, the controller 112 comprises a comparator 304, a static memory area 308, a dynamic memory area 320, and a response-creating agent 330. The static memory 308 can be, in one embodiment, a server that has a tag ID database 312 and a zone database 316. There may be up to n databases or database fields in the static memory 308. This memory is typically preprogrammed and not re-writable. For example, the tag ID numbers in the tag ID database 312 have verification information relating to any tag that the user may want to identify. If the user wishes to change the tags in the tag ID database 312, the addition of more tag IDs to the database is possible. However, attributes relating to the identity and verification information of a given tag cannot be changed if they are located within the non-re-writable memory of the controller 112. No particular type of information needs to be stored in the static memory area 308. There may be applications where it is desirable to have all data within the controller 112 be re-written on an as needed basis. In such circumstances, the static memory area 308 would not be utilized. However, there may also be times when it is desirable to have information stored in the static memory 308 of the controller 112. Also, the static memory 308 may be a read-only memory where information cannot be written to that particular portion of memory. The controller 112 is able to accept and store both read-only data and writable data.

The dynamic memory 320 is the re-writable portion of memory in the controller 112. The dynamic memory 320 may include a plurality of databases. For example, the dynamic memory 320 may have a personal database 324 and a settings database 328. In one embodiment, this particular part of the controller 112 is in communication with a programming device or devices 342 by a communication line 338. The programming device or devices 342 described above provide additional or different input to the dynamic memory 320 of the controller 112, thus making the messages to be prepared by the controller adaptable and changeable by a user of the present invention. The programming device 342 may be located proximal to a given controller 112 or may even be integral to the controller 112. In this event, pre-programming of the controller 112 would be done at or near the controller 112 itself. Conversely, the programming device 342 may be at a remote location. For instance, the controller 112 may be located at a user's house while the programming device 342 may be any remote computer that has access to the Internet. The controller 112 at their home is then programmable via the Internet from a user's computer located at their office.

Providing remote programming capabilities gives the reminder system 100 another dimension of adaptability. Using a programming device 342 that is not located near the controller 112 allows a user to personalize their message or settings. Therefore, users of the reminder system 100 are not confined to programming when they are near the controller 112. Again, when a user is reminded at work to grab a book for a colleague from home. The user can remotely program their controller 112 at home to remind them to take the book before they leave tomorrow. When the user goes to leave the following morning, the controller 112 knows to look for the book as a part of the desired items this particular user wishes to have with them. If the book is not detected (i.e., the RFID tag corresponding to the book is not detected by the RFID reader or the magnetic identification strip is not read by the magnetic reader) the controller detects this and generates a message to remind the user to grab their book. Also, the user may provide other individuals remote access to the controller 112. In the above example, the user may allow the colleague to program the reminder message into the controller 112, rather than doing it himself/herself. This feature can also be desirable if a wife wishes to remind her husband, or vice versa, that he/she needs to bring an item from work back home. In one configuration, the controller 112, specifically the dynamic memory 320, may be protected by a firewall (not shown) to ensure that not just anyone has access to the controller 112. Password verification, biometric identification, smart cards, or other protection systems can provide selective access as security to the remote programming feature.

Initially, input from the readers and identifiers are sent by the communication line 300 to the comparator 304. The comparator 304 directs the information to the corresponding area of memory. If the object identification information resides in the dynamic memory 320, then the comparator 304 requests that particular information from the dynamic memory 320. Likewise, the comparator can request information residing in the static memory 308. The comparator 304 takes data from both the dynamic memory 320 and the static memory 308 and determines what items, if any, are missing for this particular person. The comparator 304 does this by comparing settings data 328 having the required list of items desired against the items that were detected by the scanner 108. Then the message information is sent to the response-creating agent 330 where the personalized message is transformed into a format that can be utilized by the notification agent 116. The formatted message is sent to the notification agent 116 by the communication line 334, which corresponds to the output line of the controller 112.

Figure 4:
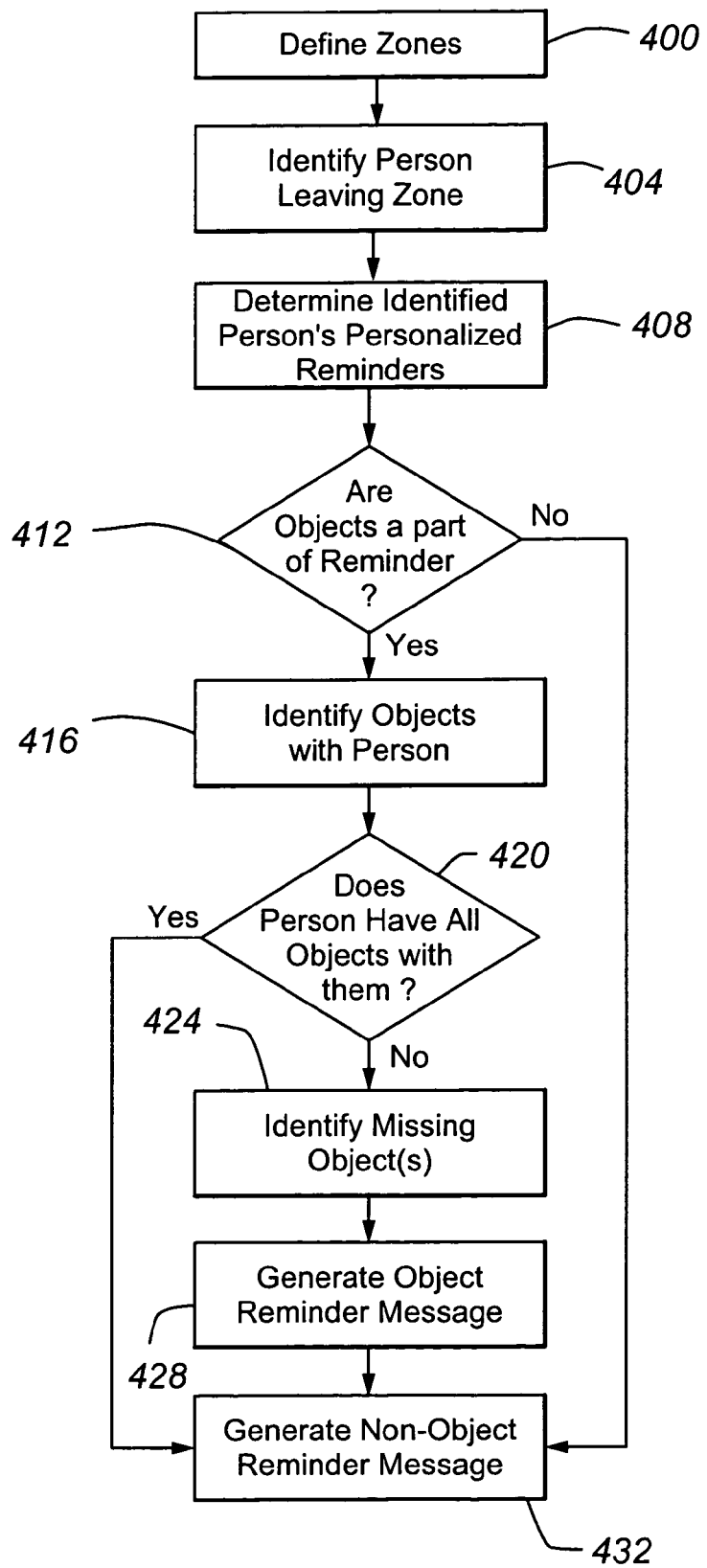
FIG. 4 is a flow chart depicting the departure based reminder system logic in accordance with a further embodiment of the present invention.

Referring to FIG. 4 the logic of the departure based reminder system will be discussed in accordance with one embodiment of the present invention.

Initially, zones are defined in step 400. The zone 104 can be simply defined by the range of a scanner 108 or identifier 120 being used and therefore do not need to be user specified. Alternatively, a zone 104 can be an entire room in a house, or even the house itself. For example, if the predetermined zone 104 is the entire house, multiple readers could be placed at every exit point in the house and notification agent 116 located at every door provides the same message for that given zone. If multiple controllers are used in a single predetermined zone, each can be connected forming a controller network.

In an alternative configuration, multiple scanners and/or identifiers can be connected to a single controller. The scanners and/or identifiers may be placed at various zones within a given reminder system and the controller relates zone information with a particular scanner/identifier. This configuration allows multiple zones to be controlled by a single controller, thereby decreasing the cost of implementing the reminder system 100.

In step 404, the person 128 leaving the predetermined zone 104 is identified. A person 128 can be identified either by the identification agent 120 as described or may be identified by the items that they are carrying. In the latter case, the scanner 108 provides the identification information to the controller 112.

In step 408, the controller 112 determines the identified persons personalized reminders. These reminders may be relating to a forgotten item 136 or forgotten items. Also, the personalized reminders generated may be other preprogrammed reminders that have nothing to do with the items that the person 128 is carrying.

In step 412, it is determined if objects are a part of the personalized reminder. If so, the identity of the objects that are with the person are identified by the scanner 108 in step 416. If not, the person is given a non-object reminder in step 432. A non-object reminder simply states, "Have a nice day" or "Bye Bye".

In step 420, the controller 112 determines if the identified person 128 has all of his/her desired objects by making comparisons between the required objects in it's settings database 328 and identified objects from the tag ID numbers database 312. If during the comparison the controller determines that every desired object is with the person 128, then the person 128 is given a non-object reminder in step 432. However, if at least one object is identified as missing, the missing object(s) 136 are identified in step 424. Performing a comparison function in the comparator 304, where a list of required objects are matched and compared to a list of present objects, can identify missing objects. Once the missing object(s) are identified a message is generated in step 428 that relates to the missing object(s). If there are other non-object reminders to be given to the person 128, then the non-object reminder message can be appended to the object reminder message in step 432. In an alternative implementation, the object reminders are sent first to the notification agent 116, then the non-object reminders are sent to the notification agent 116. This is the easiest way to provide separate messages to the notification agent 116 and therefore the person 128. However, the object and non-object messages can be combined by the controller 112 to generate a different personalized message that incorporates both messages, but is not divided into two distinct object and non-object messages.

Figure 5:
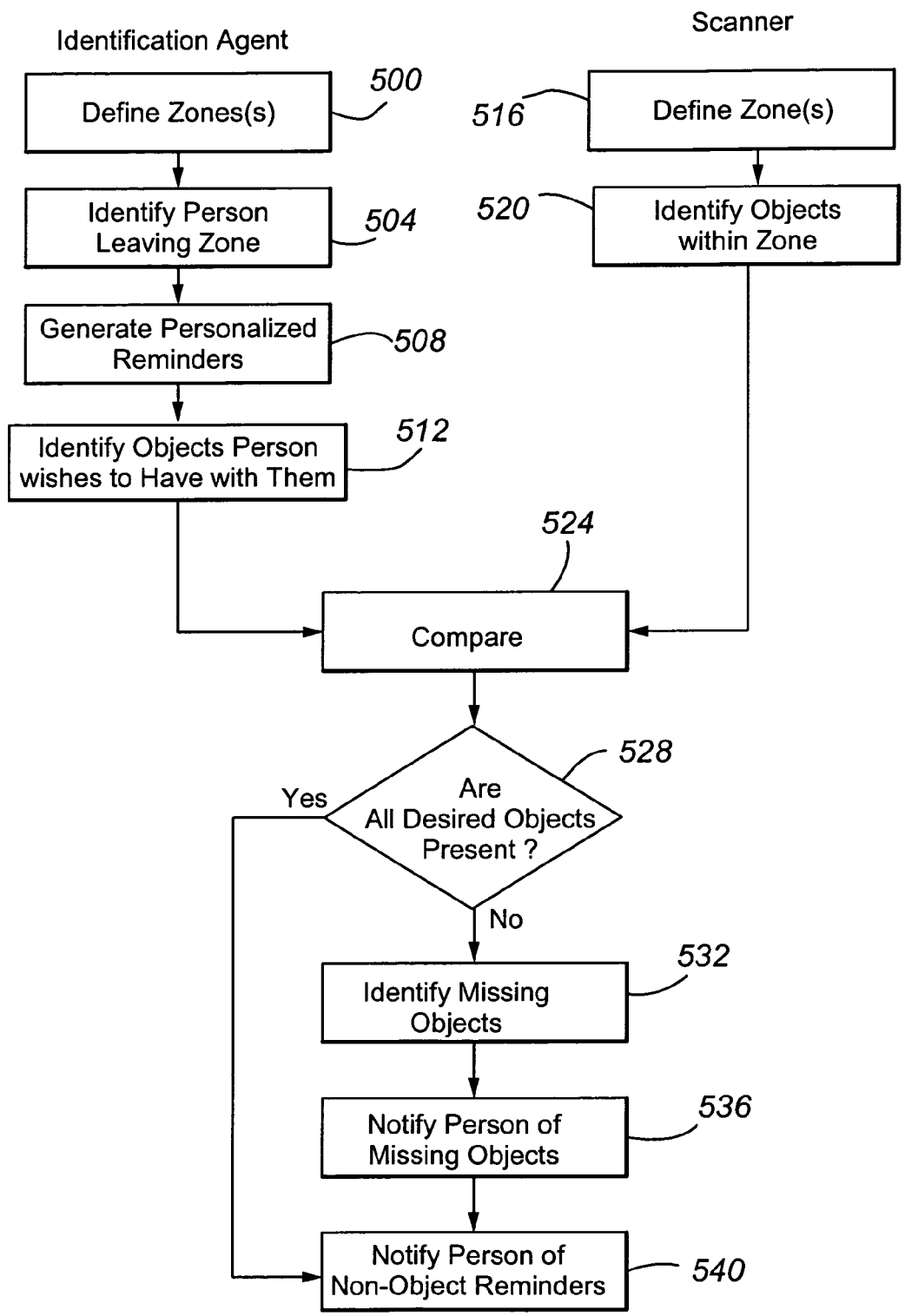
FIG. 5 is a flow chart depicting yet a further embodiment of the departure based reminder system logic.

In FIG. 5 a variant of the logic presented in FIG. 4 is discussed in accordance with another embodiment of the present invention.

The identification of the person 128 and the objects 132a-n does not need to be done in sequence as was discussed above. In an alternative implementation, the object identification and person identification are done in parallel. The person is identified this time by the identification agent 120 and not by the object that the person 128 is carrying. A compare step 524 is explicitly performed in parallel processing. The zones are defined in the same manner in step 500 and 516, then the person 128 leaving the zone 104 is identified. Personalized reminders for the identified person 128 are established in step 508, including identifying the items the identified person wishes to have on them in step 512. Based on the identity of the person a list of required items is generated by the controller 112.

Meanwhile, the scanner 108 has identified objects that are within the predetermined zone 104 in step 520. The comparison of the lists are performed in step 524, as described above, and then it is determined if all desired objects are present in step 528. The missing object(s) 136 are identified in step 532, then the person is notified of the missing object(s) in step 536. In step 540, the non-object reminders are given to the person 128.

Figure 6:
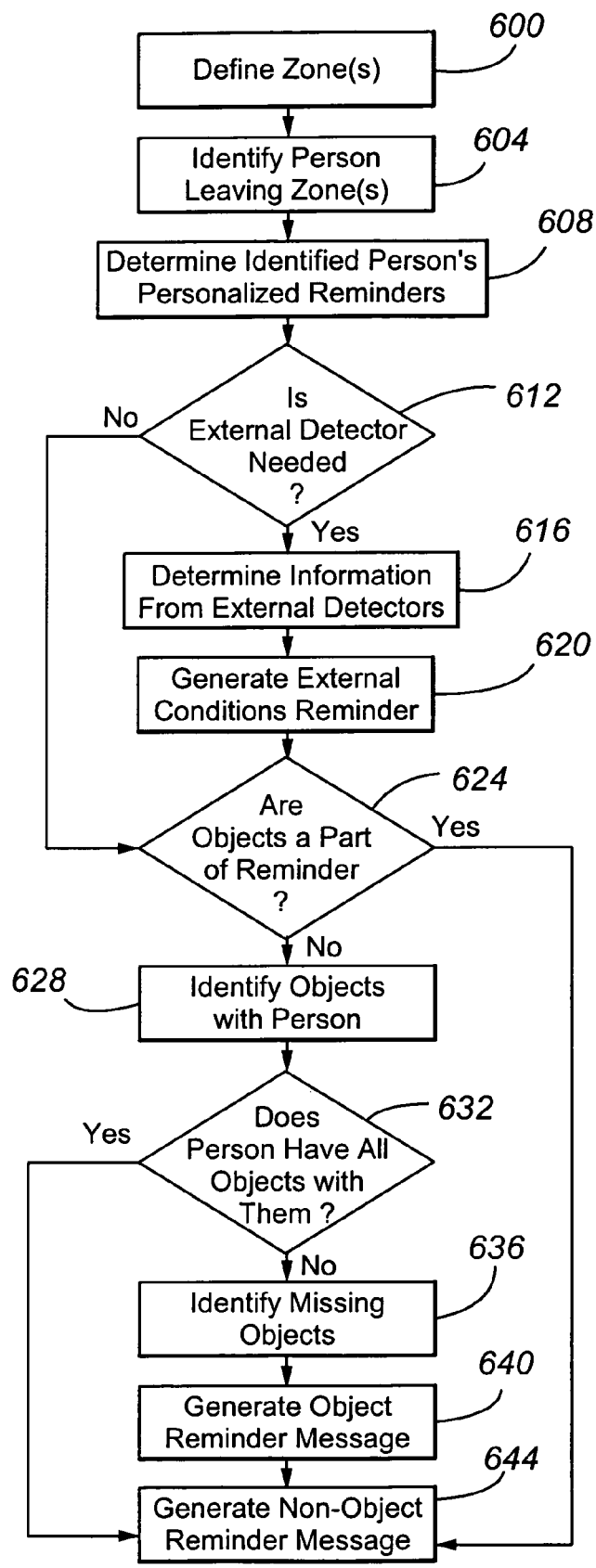
FIG. 6 is a flow chart depicting a departure based reminder system logic incorporating an external detector in accordance with one embodiment of the present invention.

As mentioned above, an external detector may also be incorporated into the departure based reminder system 100. In accordance with one embodiment of the present invention, the logic in a system that incorporates an external reader will be discussed with reference to FIG. 6.

The logic of a reminder system 100 incorporating an external reader is fairly close to that described in FIG. 4 with a few modifications. Namely, after the identified person's 128 personalized reminders are determined in step 608 it is decided whether or not an external detector 124 has information to add to the message in step 612. If so, the controller 112 receives information from the external detector 124 relating to external conditions in step 616 (i.e., weather, vehicle fuel level, etc.) In step 620, personalized reminders are generated that use the information received from the external detector 124. After the messages relating to the external detector are generated, object and non-object reminders are determined and generated in steps 624, 628, 632, 636, 640, and 644.

It should be noted that the present invention is not limited to be used by one person at a time. The identification of a "person" may be the identification of multiple people. Furthermore, through use of an appropriately sized controller and detectors multiple messages can be personalized for the identified people in a given zone and the appropriate messages can be sent to the notification agent 116 for all identified persons to receive.

Additionally, in one embodiment of the present invention, the use of the scanner 108 to identify objects in a given zone may be unnecessary. Personalized departure based reminders can be generated without identifying any objects present with a given person. For example, a personalized reminder for a person could simply be, "make sure the back door is locked." In this particular instance an external detector could be used to generate the reminder if the external detector 124 determined the back door was unlocked. However, the addition of components may not be desirable in certain circumstances and simple reminders given every time prior to departure of a certain zone may be preferred.

In still another embodiment, personalized departure based reminders are not generated for the identified person (or animal) leaving, but for someone else that would like to know information about that other person/animal leaving. For example, the controller 112 could be programmed to alert anyone inside a house if a child is identified inside of a zone and is attempting to leave that zone. Additionally, if the identified thing leaving the zone is an animal, then information could be conveyed to the owner of the animal (e.g., don't forget to take a leash for the dog, bring a water dish, etc.)

Situations may exist where the user of the present invention is carrying more items than the controller 112 anticipates for that person. In other words, the number of items with the person is greater than the number of items in the predetermined list of required items. In this case, a message may be relayed to the person to indicate that they have too many items and may want to leave a subset of those behind. Alternatively, the controller 112 may determine that at least the predetermined list of required items is met and therefore it is unnecessary to provide the user with an object reminder.

A number of variations and modifications of the invention can be used. It would be possible to provide for some features of the invention without providing others.

In another embodiment, a motion detector is positioned within and/or at the boundary of the specified location or region. The motion detector can be any suitable motion detector, such as an infrared detector (which senses thermal energy from or the thermal energy fingerprint of a person's body), a sound detector (which senses noise from a person moving through an area), an airflow detector (which senses the movement of air from a person moving through an area), and a vibration detector (which detects a person's foot falls). When movement of a (human-sized) object is detected, the list of previously selected items and/or activities is announced. The list or set of objects may have one or more members and were previously selected and programmed by the person using a suitable user interface. More elaborate motion detectors, however, may be able to distinguish the distinctive characteristics of each person's thermal "fingerprint" or differences in the thermal signature of each person's body.

In another embodiment, a GPS-based location system is coupled with a reminder system to provide a location-based reminder system. GPS signals would be analyzed to trigger a reminder when a person has left a selected spatial area. For example, if the reminder is to bring a book to work, the reminder would be provided as the person is pulling his car out of the driveway and/or onto the street. In that event, it would still be convenient to return to the house and grab the book. In this embodiment, the GPS locator and reminder would be carried by the person and would communicate with one another via an interface. Typically, the GPS locator would provide GPS coordinates to the reminder system. The reminder system would map the coordinates against a list of coordinates. When, during a specified elapsed time period, the difference between a selected or previously sensed set of coordinates (at which the person was previously located within the elapsed time period) and the current set of coordinates is greater than or equal to a specified distance, the reminder would be provided to the person. Alternatively, the selected set of coordinates could be the location at which the reminder is to be provided. Thus, in the above example the selected set of coordinates would be the location of the person's driveway and, when the GPS coordinates provided to the reminder system coincide with the selected set of coordinates, the reminder would be provided. The combined GPS/reminder device could be positioned in or on a device the person always carries on his person, such as a cellular phone, a PDA, an item of jewelry (e.g., watch, ear ring, necklace, bracelet, neck chain, etc.), a chip implant, and the like, so the device itself is not forgotten.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) determining that a person is in and/or leaving a defined area by detecting the proximity of the person to a selected point within and/or bordering the defined area;
   (b) in response to the determining step, identifying a reminder to be provided to the person, wherein the reminder includes information about at least one object associated with the person;
   (c) providing the reminder to the person before the person leaves the defined area;
   (d) determining an actual or possible set of weather conditions, and wherein step (b) comprises:
      (b1) mapping the possible set of weather conditions against a plurality of sets of weather conditions to determine at least one object associated with the possible set of weather conditions, wherein the reminder provided in step (c) includes the determined at least one object.

2. A location-based system, comprising:
   a controller operable to (i) determine that a person is in and/or leaving a defined area by detecting the proximity of the person to a selected point within and/or bordering the defined area; (ii) when a person is determined to be in and/or leaving the defined area, identify a reminder to be provided to the person, wherein the reminder includes information about at least one object associated with the person; and (iii) provide the reminder to the person before the person leaves the defined area; and
   at least one sensor operable to determine an actual or possible set of weather conditions, and wherein the controller performs the sub-operations of:
      mapping the possible set of weather conditions against a plurality of sets of weather conditions to determine at least one object associated with the possible set of weather conditions, wherein the reminder provided to the person includes the determined at least one object.

* * * * *